United States Patent [19]

Seino et al.

[11] Patent Number: 5,307,495
[45] Date of Patent: Apr. 26, 1994

[54] MULTIPROCESSOR SYSTEM STATICALLY DIVIDING PROCESSORS INTO GROUPS ALLOWING PROCESSOR OF SELECTED GROUP TO SEND TASK REQUESTS ONLY TO PROCESSORS OF SELECTED GROUP

[75] Inventors: Satoshi Seino, Fukushima; Hidenori Umeno, Kanagawa; Kiyoshi Ogawa, Yokohama; Katsumi Takeda, Hadano, all of Japan

[73] Assignee: Hitachi, Ltd., Tokyo, Japan

[21] Appl. No.: 735,674

[22] Filed: Jul. 29, 1991

Related U.S. Application Data

[63] Continuation of Ser. No. 260,783, Oct. 21, 1988, abandoned.

[30] Foreign Application Priority Data

Oct. 23, 1987 [JP] Japan ................... 62-266355

[51] Int. Cl.⁵ ............................................. G06F 13/00
[52] U.S. Cl. ................................... 395/650; 395/200; 395/325; 395/800; 364/228.2; 364/230.3; 364/DIG. 1
[58] Field of Search ............. 395/200, 375, 800, 325, 395/650; 340/825.06; 364/131, 133

[56] References Cited

U.S. PATENT DOCUMENTS

| | | | |
|---|---|---|---|
| 3,768,074 | 10/1973 | Sharp et al. | 395/325 |
| 4,644,470 | 2/1987 | Feigenbaum et al. | 395/200 |
| 5,107,420 | 4/1992 | Kametani | 395/650 |
| 5,131,084 | 7/1992 | Kasashima et al. | 395/325 |

OTHER PUBLICATIONS

Arnold et al, "A Hierarchical Restructurable Multi-Microprocessor Architecture", IEEE, Jan. 1976, pp. 40-45.

Primary Examiner—Thomas C. Lee
Assistant Examiner—Paul Harrity
Attorney, Agent, or Firm—Antonelli, Terry, Stout & Kraus

[57] ABSTRACT

In a computer system capable of being configured in a multiprocessor system, a plurality of virtual machines are grouped by object of use to define a plurality of processor groups. Each processor has an identifier for a processor group to which it belongs. When an instruction which requires synchronous execution among the processors is executed, the processor identifies the processor group to which it belongs and requests the synchronous execution of the instruction to only the processors in the group. In another aspect, each processor which has a request for execution refers to its own identifier to determine if the request is from a processor of the same group in order to determine whether it should execute the instruction or not. When the processor completes the execution of the instruction, it sends an end signal to the requesting processor so that another instruction from other processors in the same group can be executed.

36 Claims, 9 Drawing Sheets

GROUP CONTROL INSTRUCTION FORMAT

SPGID INSTRUCTION

SNPG INSTRUCTION

CTLPG INSTRUCTION

{ 0: LIMIT EXECUTION BY PROCESSOR GROUP
1: NOT LIMIT EXECUTION BY PROCESSOR GROUP

MULTIPROCESSOR SYSTEM STATICALLY DIVIDING PROCESSORS INTO GROUPS ALLOWING PROCESSOR OF SELECTED GROUP TO SEND TASK REQUESTS ONLY TO PROCESSORS OF SELECTED GROUP

This application is a continuation of application Ser. No. 260,783, filed Oct. 21, 1988 now abandoned.

BACKGROUND OF THE INVENTION

The present invention relates to a multiprocessor system of a computer, and more particularly to control method and apparatus suitable for constructing a virtual machine on a multiprocessor system.

In a conventional multiprocessor system such as System 370 of International Business Machines Corporation, when one of processors of the multiprocessor system executes an instruction which requires signaling of the processor, the signaling is effected to all processors of the system to synchronize the execution. Such instructions include a purge translation buffer extended (PTLBE) instruction, an invalidate page table entry (IPTE) instruction, a set storage key extended (SSKE) instruction, and a reset reference bit extended (RRBE) instruction.

The PTLBE instruction is an instruction for a multiprocessor system and it requests to all processors of the system to invalidate all entries in the address translation look-aside buffer which have been valid so far. Accordingly, when the PTLBE instruction is issued, the processor which has issued that instruction invalidates the address translation look-aside buffer of its own and signals to all other processors to invalidate their address translation look-aside buffers. The other processors of the system respond to the signal to invalidate the address translation look-aside buffers of their own. The invalidating processes are effected in synchronism in the system, and when the invalidation of the address translation look-aside buffers of all processors has been completed, an instruction next to the signaling instruction is executed.

The IPTE instruction is an instruction used when a correspondence relationship between a real page in a real memory and a virtual page in a virtual memory no longer exists because of page-out processing. This instruction sets an invalid bit (I bit) of an entry of a page table to be invalidated to "1". Since the page to be invalidated may have already been registered in the address translation table, the content of the address translation look-aside buffer is checked, and the entry of the address translation look-aside buffer whose page field and page table start address used to register the entry of the address translation look-aside buffer are identical to a page field and a page table start address designated by the IPTE instruction and which is identical to the content of the page table entry designated by the IPTE instruction is invalidated. If the system is of multiprocessor configuration, the respective processors signal as they do for the PTLBE instruction to purge the entries of the address translation look-aside buffers of all processors.

The SSKE instruction designates a real address to modify a main storage key of the corresponding page. Since the real page address whose main storage key is to be modified and the corresponding main storage key may have already been stored in the address translation look-aside buffer, the main memory key of the entry corresponding to the real page address is updated when the SSKE instruction is issued. The SSKE instruction is also executed in synchronism among the processors of the multiprocessor as is done by the aforementioned instruction.

In a virtual machine system, when the above instruction is executed by a virtual machine (VM), a virtual machine control program (VMCP) which controls the virtual machine system grasps the event and simulates the instruction to execute the instruction.

When the virtual machine issues the IPTE instruction, the control program (VMCP) of the virtual machine system determines the contents of a page table entry based on the address translation table start address of the virtual machine, translates it to an absolute address of the virtual machine, further translates it to a real address of a real machine, and issues the IPTE instruction by utilizing a page table for the control program. When the control program issues the PTLBE instruction, the entire address translation look-aside buffer is purged. As a result, the entries of the address translation look-aside buffers related to the virtual machines other than the one which issued the IPTE instruction or the entries of the address translation look-aside buffers related to the control program are also invalidated. This may reduce performance of other virtual machines. In order to avoid it, the IPTE instruction is issued to invalidate the entry of the address look-aside translation buffer related to the virtual machine as much as possible.

The simulation by the VM control program (VMCP) of the IPTE instruction issued by an operating system (OS) on the VM has thus been described. Since an overhead of the VM is increased by this method, the IPTE instruction issued by the OS on the VM may be directly executed by hardware. Even in such a case, if the OS on the VM operates on only one of the processors of the system, the hardware cannot recognize it and it sends a signal to all processors of the multiprocessor system to request synchronous execution. Accordingly, the same problem as that described above takes place.

Where the virtual machine operates on a plurality of processors, it is possible for the virtual machine to occupy a specific processor for operation. In this case, if the IPTE instruction is issued by the virtual machine which occupies the processor, the address translation look-aside buffer related to the virtual machine is limited to the address translation look-aside buffer which belongs to the processor which has operated the virtual machine. However, in the prior art, when the entry of the address translation look-aside buffer is to be purged as a result of executing the IPTE instruction issued by the virtual machine, a signal is sent to other processors to unconditionally search corresponding entries in the address translation look-aside buffers of all the processors and to purge them if any. All processors execute the instruction synchronously and the next instruction is executed after the invalidation of the entries of the address translation look-aside buffers of all processors has been completed.

As described above, when the virtual machine operates on only one processor, the entry of the address translation look-aside buffer which the virtual machine may use is limited to the one belonging to that one processor but the signaling is effected to the entire system. As a result, excess purge of the entry of the address look-aside translation buffer due to the communication overhead among the processors and the execution of the IPTE instruction by other processors is possibly effected. This affects the efficiency of the overall system and lowers the system performance.

SUMMARY OF THE INVENTION

It is an object of the present invention to provide a multiprocessor system which groups processors in accordance with a desired system operation condition so that signaling among the processors is limited to those processors which need such signaling.

It is another object of the present invention to provide an instruction execution method to improve performance in a computer system which configures a virtual machine by a multiprocessor.

In accordance with a first conceptual feature of the present invention, a plurality of processors of a system are variably grouped in accordance with a desired configuration condition. Group identification information is set to each processor. A processor which received an instruction which requires signaling identifies a group to which it belongs based on the group identification information assigned thereto, and responds to the signaling related to the processor group to which it belongs but invalidates the signaling which is not related to its own group. Each processor has a group identification information hold mechanism and a signaling selective response mechanism.

In accordance with a second feature of the present invention, in a computer system having processors sharing a main memory, the processors are grouped and a group identifier representing a group to which each of the processors belongs is assigned to each processor. When a processor issues an instruction such as the IPTE instruction which needs synchronous execution, a signal for requesting synchronous execution of the instruction is sent to only the processors belonging to its own group. Each processor has a group identify mechanism and a selection mechanism for selectively sending the synchronous execution request signal.

In the multiprocessor system which configures the virtual machine system in accordance with the first feature, each processor has, as the group identification means, a processor group register for storing a processor group to which it belongs, and each processor can identify the processors within its group by referring the content of its own processor group register.

When each processor communicates with others, a sending processor sends the content of the processor group register together with the communication information. A receiving processor extracts the signal relating to the processor group from the signal information sent from the sending processor, compares it with the content of its own processor group register, and if they are equal, accepts the signal and responds to the signal. If they are not equal, the signal is not accepted. In this manner, the processor group for the signal is defined and the communication overhead among the processors is reduced, the excess purge of the address translation look-aside buffers of the processors are prevented and the system performance is enhanced.

In accordance with the second feature, the processors are grouped. Each processor has, as group identification means, a register for identifying a processor group to which it belongs. When each processor communicates with other processors to request processing, each processor refers the group register or group identification means and sends the execution request signal only to the processors belonging to its own group. The receiving processor stores the identification of the sending processor and sends back a signal required to the synchronous execution. Thus, the synchronous execution can be attained in the processor group. The groups may be changed as required.

DESCRIPTION OF THE PREFERRED EMBODIMENTS

Figure 1A:
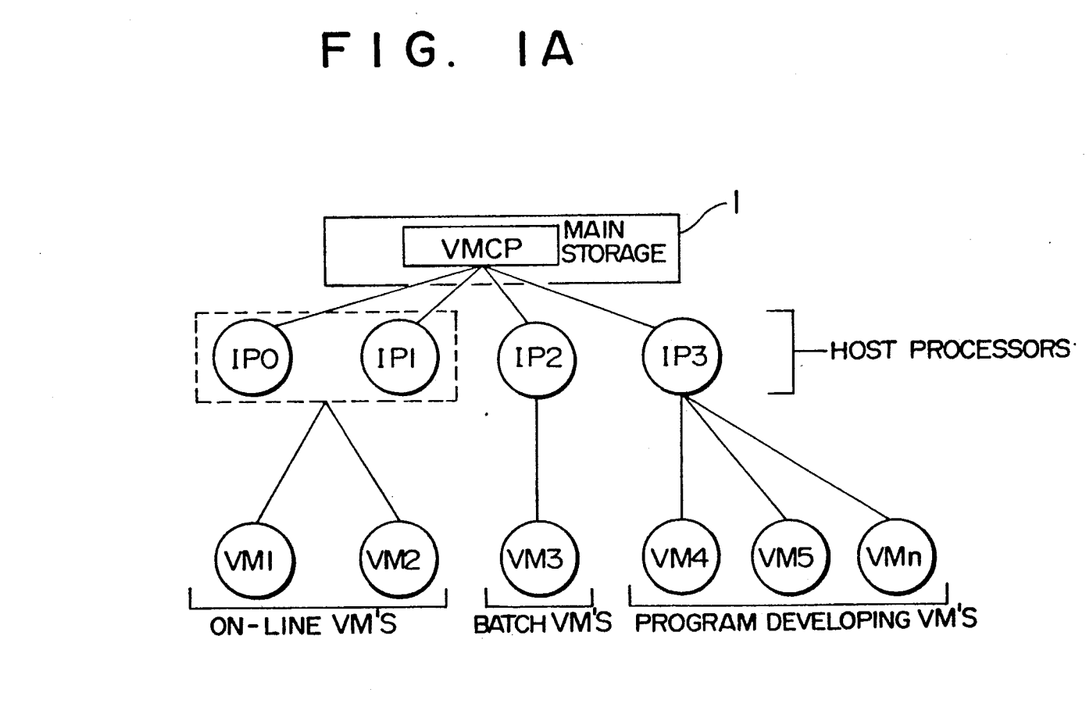
FIG. 1A shows a diagram for explaining a basic concept of the present invention.

FIG. 1A illustrates a basic concept of the present invention. IP0, IP1, IP2 and IP3 denote processors which constitute a multiprocessor sharing a main storage 1. In FIG. 1A, four multiprocessors are shown although any number of processors may be included in the system. The main storage 1 stores a virtual machine control program (VMCP) which defines virtual machines $VM_1$, $VM_2$, $VM_3$, $VM_4$, $VM_5$ and $VM_n$ and controls those VM's. When the multiprocessor system is operated, it may be desired to use the processors by object of use to improve the overall system operation efficiency. For example, in FIG. 1A, the processors IP0 and IP1 may be used for on-line processing, the processor IP2 may be used for batch processing, and the processor IP3 may be used for program development. In such a case, the processors are grouped and each group is assigned with a particular object of use. In each processor group, some virtual machine (VM's) are operated and an operating system (OS) which fits to the object of use is run on the VM's so that the object of use of the processor group is attained. The VM's are operated only in the processor group to which they belong. For example, in FIG. 1A, $VM_1$ and $VM_2$ are operated by only the on-line processing processor group IP0 and IP1, $VM_3$ is operated only by IP2, and $VM_4$, $VM_5$ and $VM_n$ are operated only by IP3. In other words, $VM_1$ and $VM_2$ occupy IP0 and IP1, $VM_3$ occupies IP2, and $VM_4$, $VM_5$ and $VM_n$ occupy IP3. Thus, the performance of each processor group is not affected by other processor groups. The method for defining the processor group and the method for defining the VM's which operate in the processor group are not fixed for the system, and they may be previously defined when the system is generated, or they may be defined or amended by the VMCP command after the system generation.

The present invention provides method and means for rapidly executing an instruction which requires synchronous execution among the processors, issued by the OS on the VM operating in the processor group.

One embodiment of the present invention is now explained with reference to FIG. 1B. A normal computer system comprises an instruction processor 100 for executing an instruction and a main storage 1 for storing the instructions. When the system is of multiprocessor configuration, an instruction processor is added to the system. The multiprocessor system generally comprises as shown in FIG. 2. In a multiprocessor system which shares the main storage 1, several instruction processors 100-103 for executing instructions are connected to a store control unit, and the main storage 1 is referred to by each of the instruction processors 100-103. In FIG. 2, two storage control units (SCU) 110 and 111 are provided for the main storage 1, and each storage control unit has two instruction processors 100, 101 and 102, 103 so that four processors are used in total to configure the multiprocessor system. A service processor 130 is provided, which is connected to each instruction processor through the respective SCU. When a virtual machine is constructed in such a multiprocessor system, it is possible to run the virtual machine on only a specific instruction processor. In this case, the address translation information of the virtual machine is stored only in the address translation look-aside buffers of the processors on which the virtual machine runs. Accordingly, if the processor group 120 is assigned to the instruction processors 100, 101 and 102, the synchronous execution may be effected for only the processors in the processor group 120 when the IPTE instruction, PTLBE instructions, SSKE instruction or RRBE instruction which requires the synchronous execution among the processors is executed. Thus, the system performance can be enhanced.

Turning back to FIG. 1B, the hardware mechanism for realizing the processor group is explained. When one of the processors of the system, for example, the processor 102 executes an instruction which requires communication among the processors (for example, IPTE instruction 610b), a signal informing it is sent to the execution unit 203a from the processor 102 through a signaling path 210. The path 210 is established between any two of IP's under control of at least one of the SCU's. The execution unit 203a responds to the signal to issue a command to the buffer unit 201 to request to fetch from the main storage 1 a parameter relating to the synchronous execution among the processors. The buffer unit 201 responds to the request to read parameter information from a specific area corresponding to the processor 102, of the system area (HSA)2 for the hardware in the storage 1, and transfers the parameter information to a signal check unit 270 where the processor group to which it belongs is compared with the processor group to which the synchronous execution requesting processor belongs. If they are equal, an equal signal is sent to the execution unit 203a through the path 230 where the instruction for the synchronous execution is executed. If the processor groups are not equal, the request signal is neglected and no execution of the requested instruction is effected.

When the processor 100 of its own requests the synchronous execution to other processors, it sends the synchronous execution request signal to the processor 102 other than the processor of its own through the path 210 and also sends a signal 250 to the parameter generation unit 290, which generates a parameter including information relating to the processor group necessary for the synchronous execution, transfers the signal to the buffer unit 201 through a signal line 260 and stores it in a specific area of the main storage 1.

The processor has a common area to store information relating to the processor group to which it belongs, and a processor group identification register 282 to store identification information of the processor group to which the processor belongs and a processor register 283 which stores the number N of processors belonging to the processor group.

The processor group identification register 282 includes a processor group identifier PGID. A format of the PGID may be a 31-bit register having bit addresses 0-30. For example, when bit i (0-30) is at a logical level "1", the processor i belongs to the processor group, and when it is at a logical level "0", the processor i does not belong to the processor group. Any format may be used so long as the processor group to which the processor belongs can be identified by referring to the content of the PGID.

Figure 3:
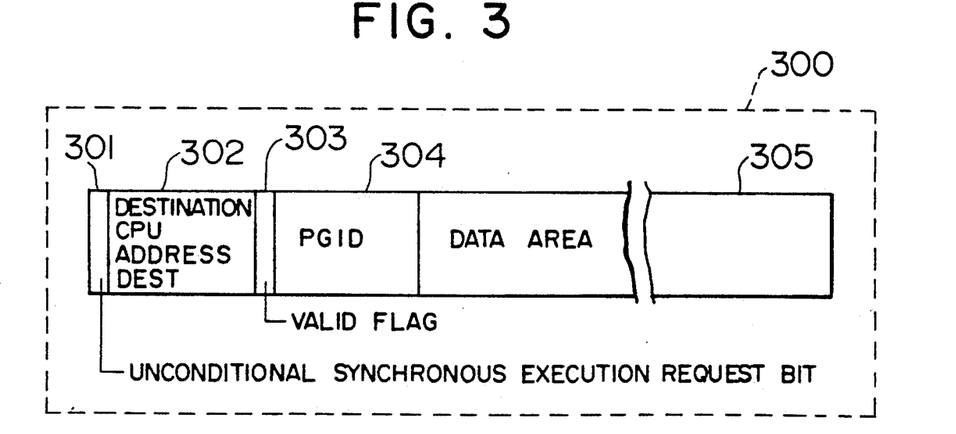
FIG. 3 shows a format of a parameter stored in a memory when synchronous execution is effected among processors.

FIG. 3 shows a content of the processing request parameter which is communicated among the processors when the synchronous execution of the processors is requested.

The parameter 300 is stored in the hardware system area (HSA)2 of the main storage 1 which can be referred to or updated only by the hardware. The parameter consists of an unconditional synchronization request bit 301, a destination code (DEST) 302, a valid flag 303, a processor group identifier (PGID) 304 and a data area 305.

The unconditional synchronization request bit 301 requests the synchronous execution to all processors of the multiprocessor system. When the bit 301 is "1", the check of the CPU address and the check by the processor group are not effected.

The destination code 302 includes the CPU address of the destination processor for which the synchronous execution is requested. This field is used when the designation of the processor address is required by, for example, a signal processor (SIGP) instruction.

The valid flag 303 is used to request the synchronous execution to the processors which belong to the same processor group as that the requesting processor belongs to. When the flag is "1", the communication by the processor group is limited. When the flag is "0", only the check for the processor address is effected.

The processor group identifier 304 stores the processor group identifier to which the synchronous execution requesting processor belongs.

The data area 305 stores the data stored in the synchronous execution requesting processor. It stores a code and data representing the type of synchronous execution.

Figure 4:
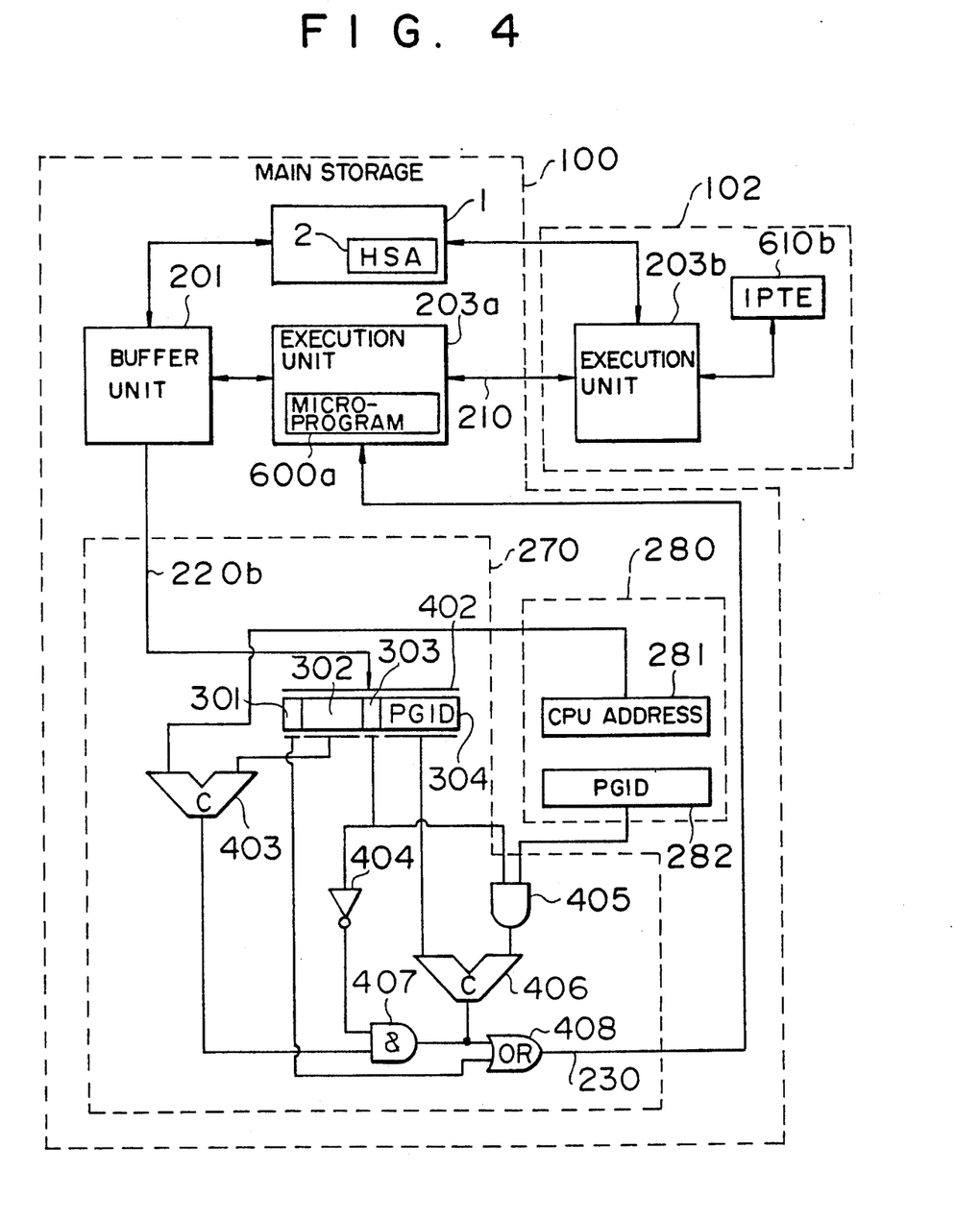
FIG. 4 shows a block diagram of a hardware configuration for checking a parameter when a synchronous execution request signal is accepted.

FIG. 4 illustrates a signal processing of the signal check unit 270 which checks the synchronous execution request signal for the processor group as to whether the request signal belongs to the processor group. The other processor 102 issues the instruction 610b which requires the synchronous execution and the synchronous execution request signal is accepted by the execution unit 203a through the signal line 210 and the request parameter 300 shown in FIG. 3 is stored into the buffer unit 201 from the hardware system area 2. In response to storing of the request parameter 300, the information excluding the data area of the request parameter is read from the buffer unit 201 through the signal line 220b and it is stored into the register 402, which functions to divide the information into the areas shown in FIG. 3 to divide the signal.

The destination code 302 in the register 402 is compared by the comparator 403 with the register 281 of the common unit 280 which stores the CPU address of itself. If the destination code and the CPU address are equal, a signal is sent to the gate 407 and a signal is sent to the execution unit 203a through the OR gate 408 and the signal line 230. The gate 407 uses, as a gate control signal, a signal which is an inversion of the valid bit 303 of the register 402 through the NOT gate 404. Accordingly, when the valid bit 303 is "1", that is, when the processor group is specified to effect the synchronous execution among the processors, the designation by the destination code 302 is neglected.

If the valid bit 303 of the latch 402 is "1", the gate 405 is open and the processor group identifier of the processor group register 282 in the common unit is sent to the comparator 406, which compares the information with the information in the processor group identifier (PGID) 304 of the register 402. When the processor group identifier of the processor which has issued the synchronous execution request is equal to the processor group identifier of the processor which has accepted the signal, a signal is sent to the OR gate 408 to instruct to the execution unit 203a through the signal line 230 to accept the request.

When the unconditional synchronization request bit 301 of the register 402 is "1", a signal is sent to the OR gate 408 to request the unconditional acceptance of the synchronous execution.

Figure 5:
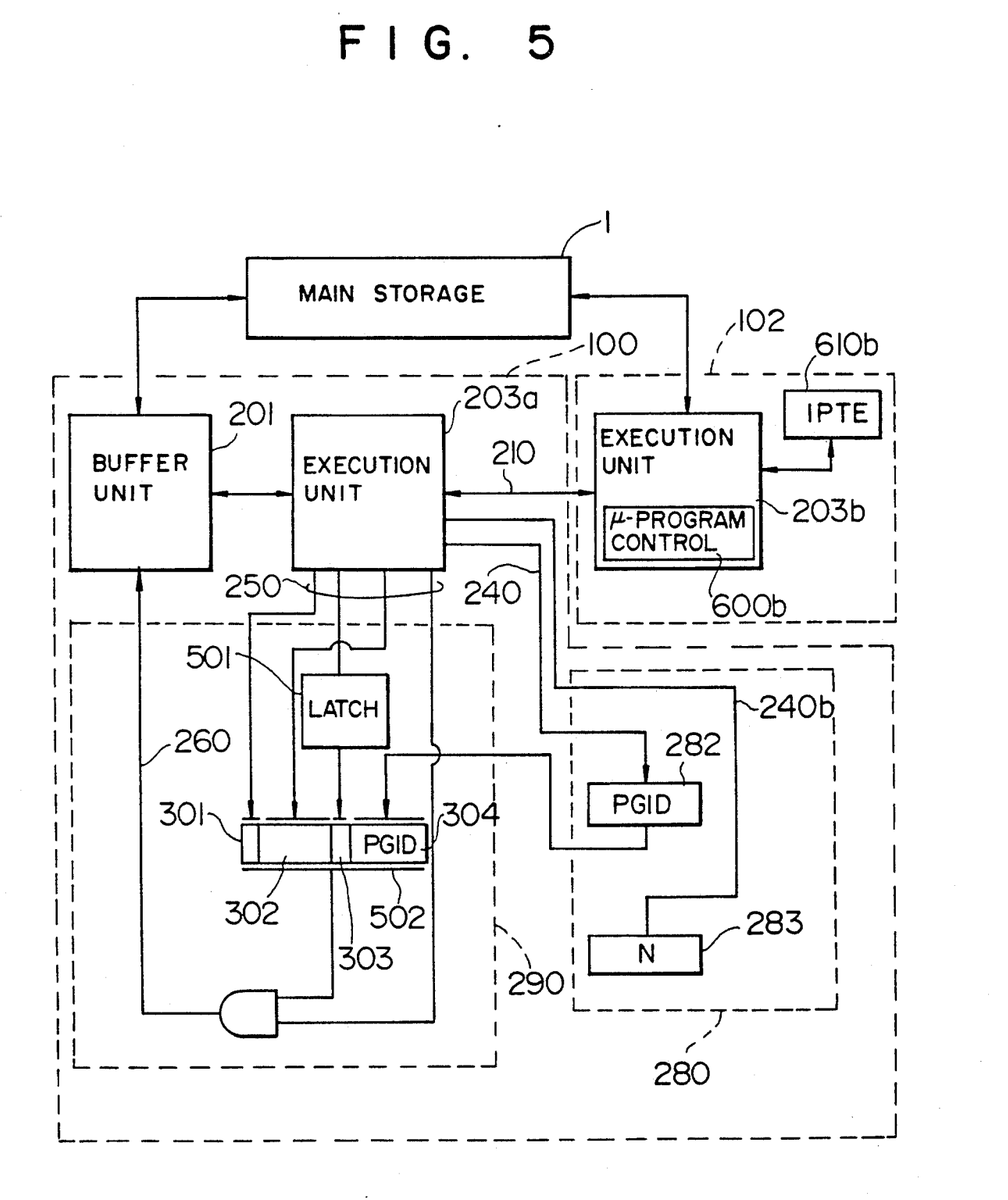
FIG. 5 shows a block diagram of a parameter generation mechanism for sending the synchronous execution request signals.

FIG. 5 illustrates a signal processing by the synchronous execution parameter generation unit 290 when the synchronous execution is requested. Instructions stored in the storage 1 are fetched to the buffer unit 201 and executed by the execution unit 203a. When an instruction requesting the synchronous execution among the processors is executed, the execution unit 203a classifies the instruction into (1) an instruction which requires communication to all processors of the system, (2) an instruction which requires synchronous execution of specified processors, or (3) an instruction which requires synchronous execution within the processor group, and sets the information of the parameter prepared in the register 502 in accordance with the classification.

The content of the unconditional synchronization request bit is determined by the execution unit 203a in accordance with the classification of the instruction and it is set into the unconditional synchronization request bit 301 of the register 502. The destination code 302 is also set therein.

The valid bit 303 is determined by the content of the latch 501. The latch 501 is set to "1" when an instruction requesting the start of limited signaling by the processor group is issued, and reset to "0" when an instruction requesting to terminate the limited signaling by the processor group is issued.

The processor group identifier 304 includes the content of the processor group register 282 in the common unit 280 of the processor group mechanism. The content of the register 282 is set when the processor issues an instruction which sets the processor group to which the processor belongs.

The hardware mechanism for realizing the processor group has thus been explained. Now, the control system by the microprogram for transmitting and sending signals among the processors is explained.

Figure 6:
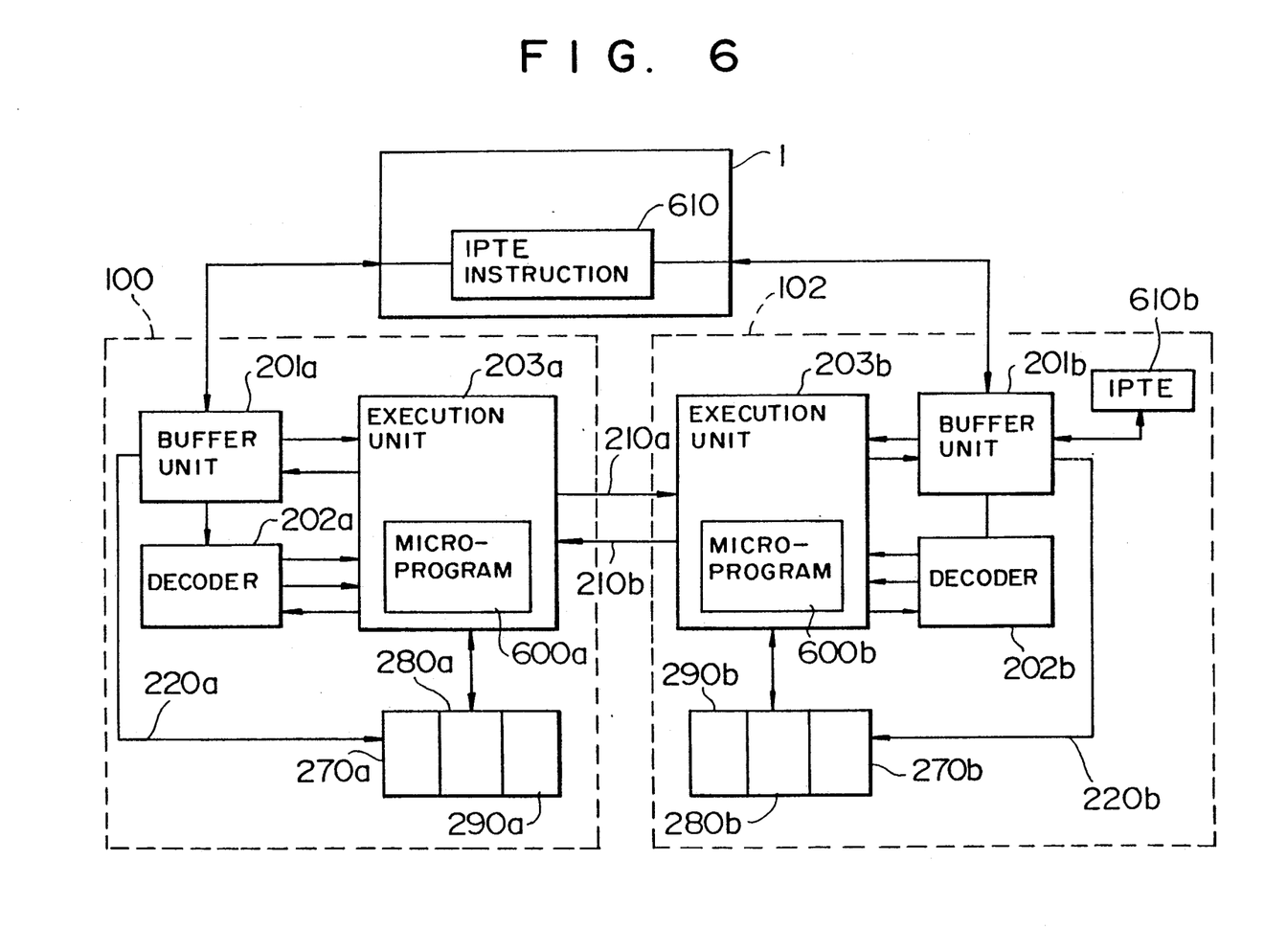
FIG. 6 shows a conceptual view of a microprogram operated among the processors for the synchronous execution.

Referring to FIG. 6, when the instruction processor 102 executes an instruction which requires the synchronous execution, the buffer unit 201b fetches the instructions 610 stored in the main storage 1 and the instructions are decoded by the decoder 202b. As a result, a control signal is sent from the decoder 202b to the execution unit 203b and the instruction is executed.

When the instruction 610 which requires the synchronous execution among the processors is to be executed, the signal 210b for requesting the synchronous execution is sent to the execution unit 203a by the microprogram 600b in the execution unit 203b. When the instruction processor 100 receives the signal, it executes the processing requested by the microprogram 600a for the requested processing in the execution unit 203a. At the end of the processing, the end signal 210a is sent to the requesting processor 102.

All of the signals from the processors are checked by the processor group mechanisms 270 (i.e. 270a, 270b, . . .), 280 (i.e. 280a, 280b, . . .) and 290 (i.e. 290a, 290b, . . .) in the processors and the processing is not accepted for the signal which the processor is not requested to accept.

In this manner, the signals are transmitted and received.

Figure 7:
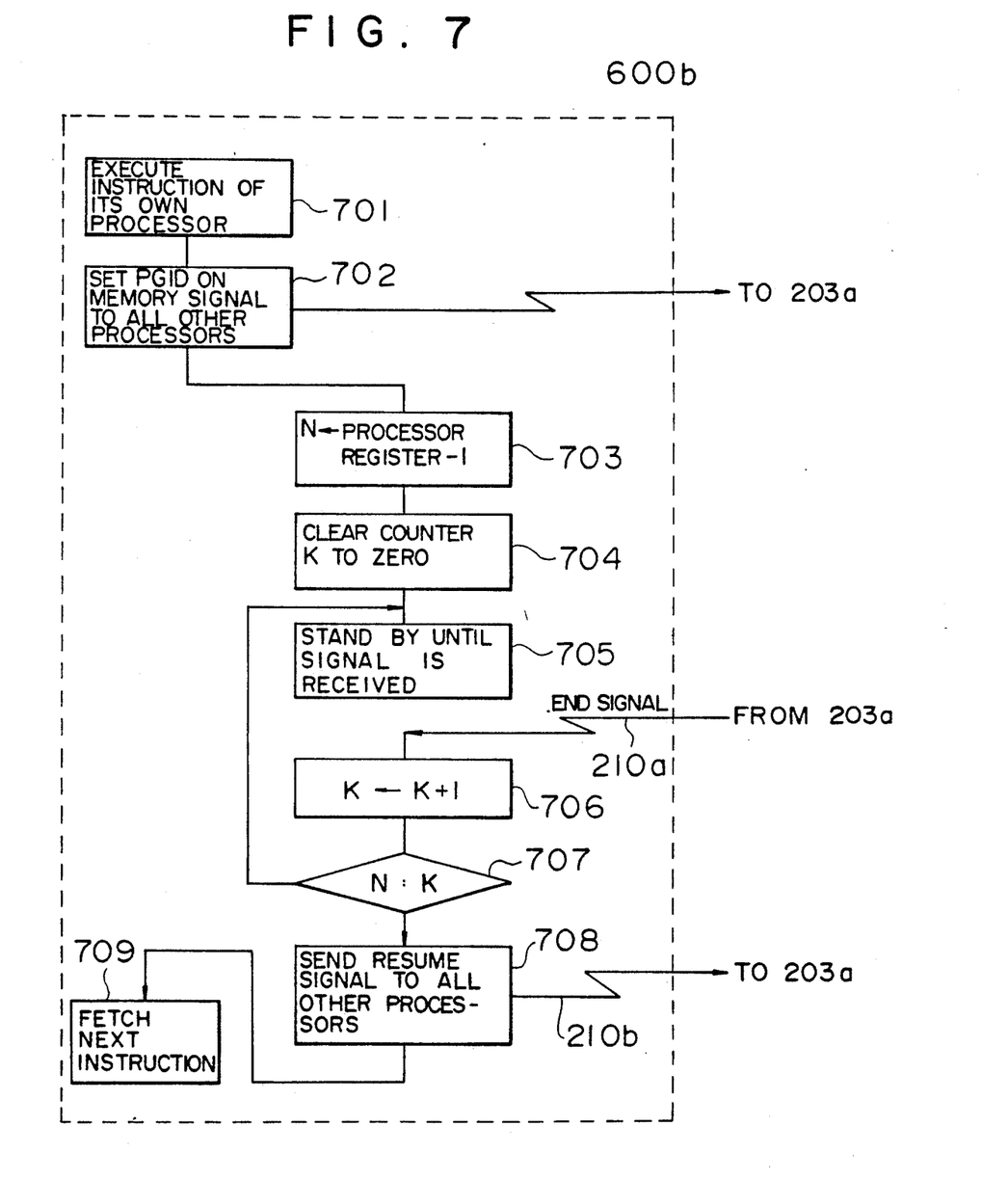
FIG. 7 shows a general flow by a microprogram in requesting the synchronous execution.

A method for controlling the microprogram when the synchronous execution in the processor group is limited is now explained with reference to FIGS. 7 and 8. FIG. 7 illustrates microprogram control 600b when the instruction requesting the synchronous execution is executed.

When the processor 102 executes the instruction 610b which requires the synchronous execution:

(1) The processor 102 first executes the instruction on its own processor (701), and
(2) Then, it sets the parameter 300 shown in FIG. 3 on the memory to request the synchronous execution to the processors of the processor group and effect the signaling 210b to all other processors (702).

The transmission parameter shown in FIG. 3 is set in the following manner.

Unconditional synchronization request bit 301 . . . 0
Destination CPU address 302 . . . any value
Valid flag 303 . . . 1
Processor group identifier (PGID) 304 . . . identifier of the processor group to which the processor of its own belongs.
Data area 305 . . . software information. Any information for hardware.

(3) The processor 102 then reduces one from the processor register (which includes the number of processors in the processor group to which the processor of its own belongs), to determine the number N of other processors which belong to the processor group (703),
(4) The processor 102 clears to zero the counter K which counts the end signals from the other processors for the synchronization (704),
(5) After the above steps, the processor 102 stands by until the end signals from the other processors are accepted (705),
(6) When the processing in the other processors is completed and the end signals 210 are accepted, the processor 102 increments the counter K which counts the event (706).

(7) The counters K and N are compared (707), and if K<N, if the end signals have not yet been received from all processors in the processor group, the processor 102 again stands by.

(8) When N≤K, that is, when the end signals are received from all processors in the group, the processor 102 sends a signal 210b to request the resumption of instruction fetching to all other processors (708).

(9) After the above steps, the processor 102 resumes the instruction fetching (709).

Figure 8:
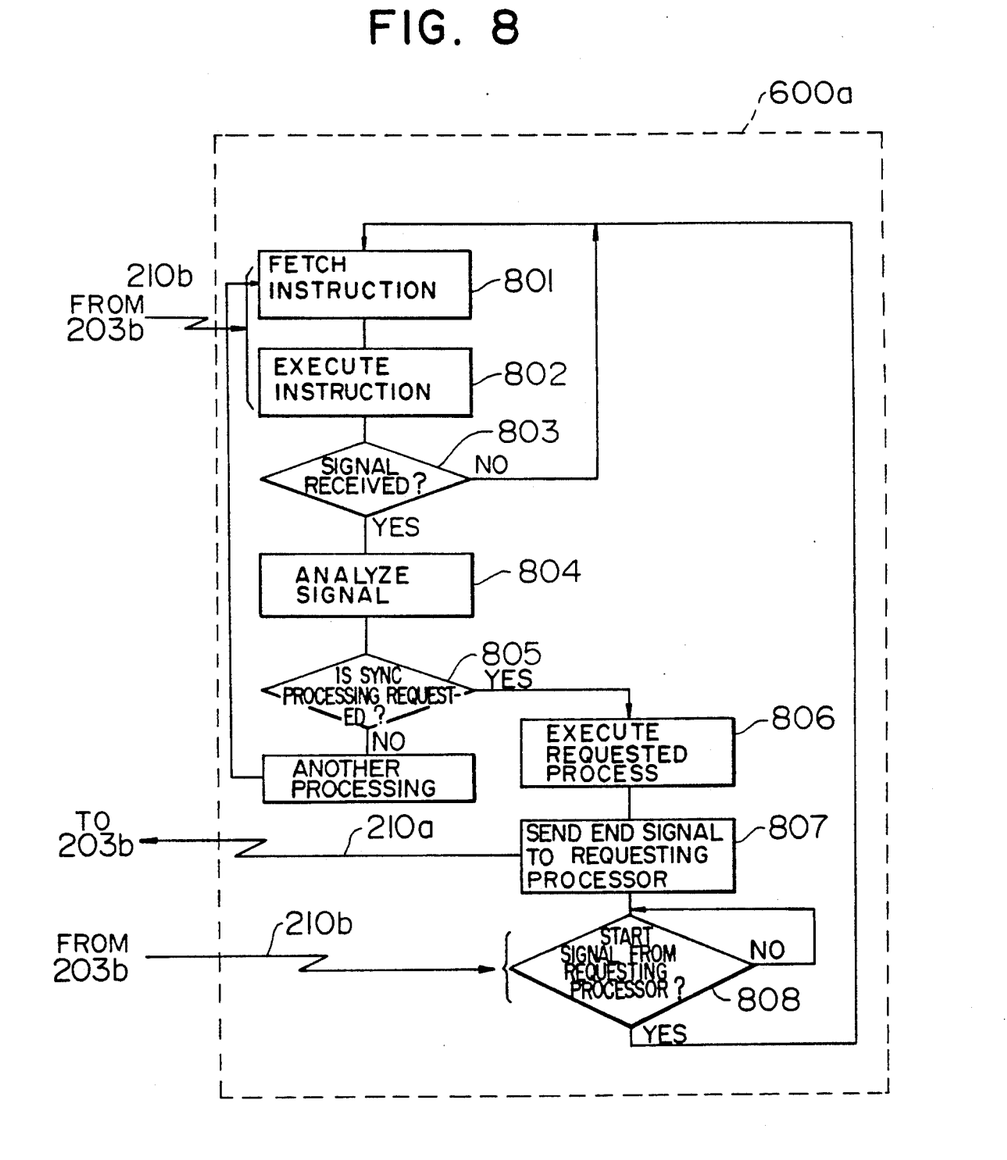
FIG. 8 shows a general flow by a microprogram in accepting the synchronous execution request signal.

FIG. 8 illustrates microprogram control of the processor when it receives the synchronous execution request signal. The receiving processor detects the processor group identifier (PGID) 304 in the parameter shown in FIG. 3 set by the requesting processor, by the circuit shown in FIG. 4, and conducts the process 600a only when the requesting processor is in the same processor group.

(1) The processor fetches an instruction to be executed from the main storage by an instruction fetching step (801), (2) The processor executes the instruction (802).

(3) The processor checks if the synchronous execution request signal has later been received (803), and if it has not been received, it continues the instruction fetching (801) and the instruction execution (802).

(4) If the synchronous execution request signal has been received, the processor analyzes the signal (804).

(5) The processor selects the requested process (805).

(6) The processor executes the requested process (806).

(7) After the above steps, the processor sends the signal 210a to the synchronous execution requesting processor to inform the end of process (807).

(8) The processor then stands by until it receives the resume signal from the synchronous execution requesting processor (808). When the synchronous execution requesting processor sends the resume signal 210b, the processor resumes the execution of the instruction of its own processor.

In the microprogram control shown in FIGS. 7 and 8, the requesting processor sends the request signal to all processors of the system, and the receiving processor checks if the requesting processor belongs to the same processor group, and only if it belongs to the same processor group, the receiving processor conducts the requested process. At the end of the process, the processor which ended the process informs the end of process to the requesting processor. In this manner, the synchronous execution is attained when the signal processing by the processor group is limited.

In addition to the embodiment described above, a second embodiment is described below.

(1) When the processor signals the process request to the other processors after it has executed the instruction, it signals only to the processors belonging to the processor group to which it belongs.

(2) The requesting processor receives all the end signals from the processors in the processor group and thereafter sends a signal to resume the other processors to the processors in the processor group.

In the second embodiment, the signaling from the requesting processor is effected only to the processors in the processor group. Accordingly, the determination of the processor group is not required for the receiving processor.

To this end, each processor should have a processor group identifier. The PGID 282 shown in FIG. 1B corresponds to the identifier. The requesting processor checks the PGID 282 and signal to the corresponding processor.

In the sending microprogram control, the signal is sent only to the processors in the processor group in steps 702 and 708 in FIG. 7. The receiving microprogram control is the same as that shown in FIG. 8.

Figure 9:
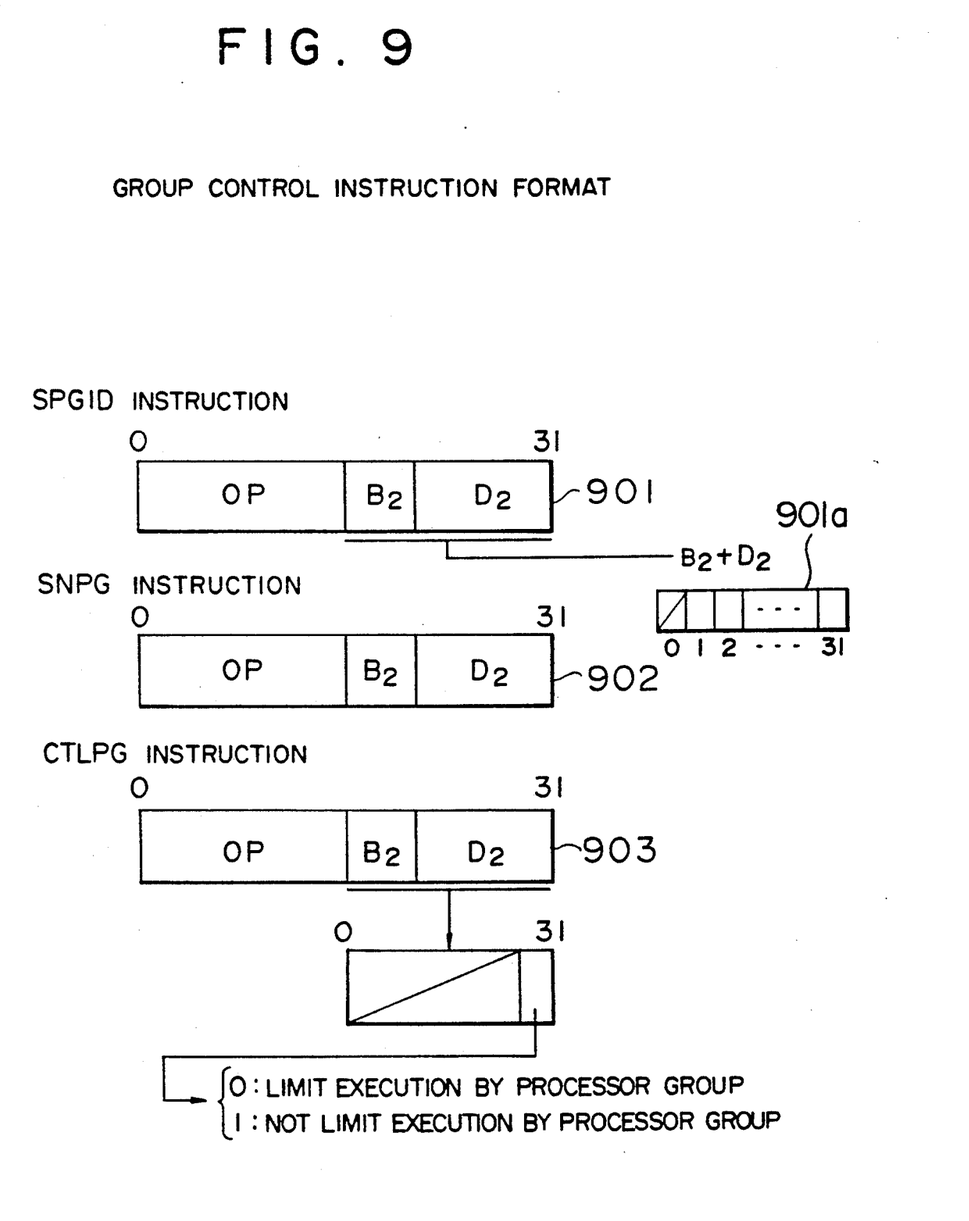
FIG. 9 shows a format of a control instruction for controlling the processor group.

FIG. 9 shows an instruction for controlling the processor group and a format thereof.

Figure 1B:
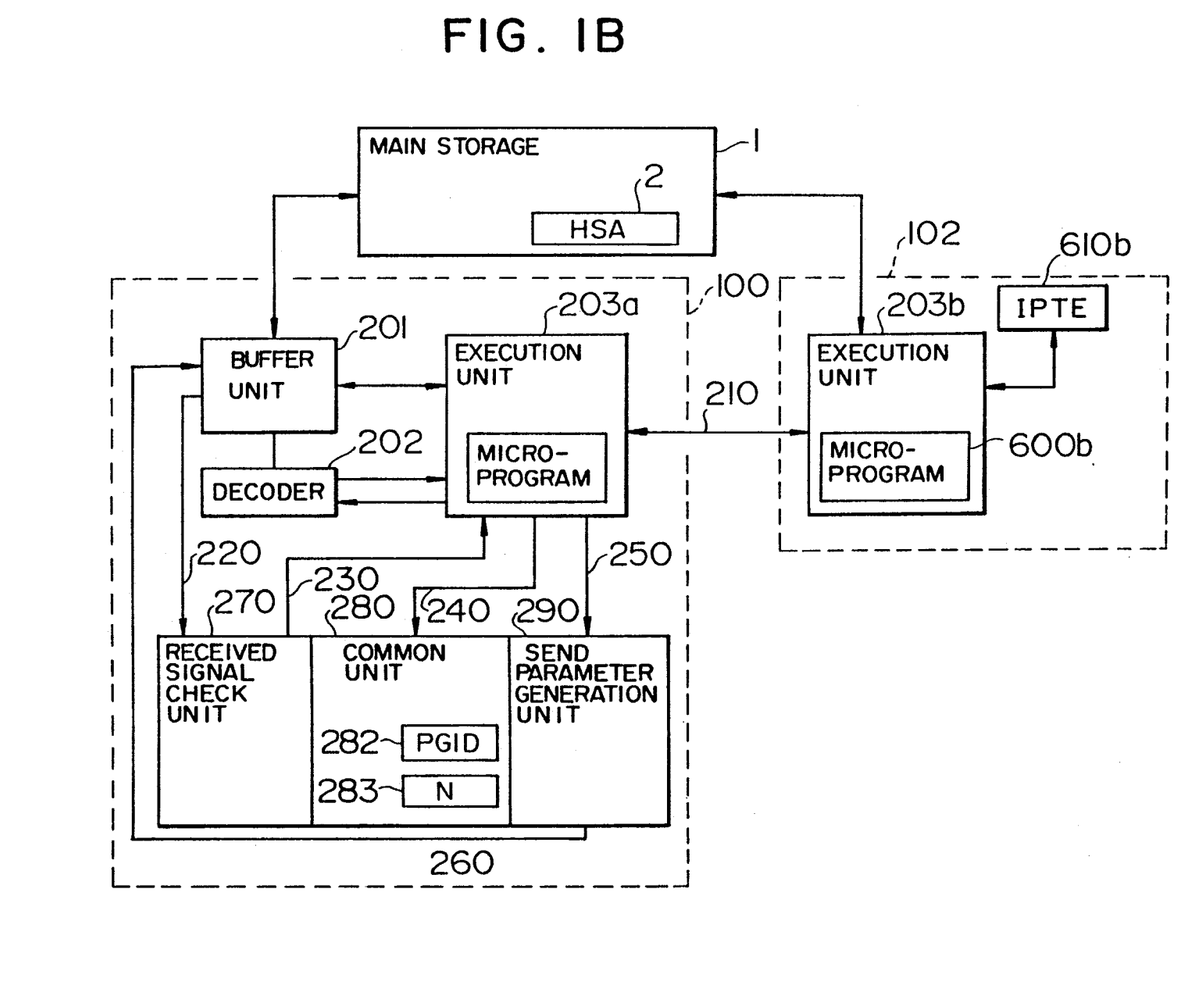
FIG. 1B shows a diagram illustrating an essential portion of a multiprocessor system according to one embodiment of the present invention.
Figure 2:
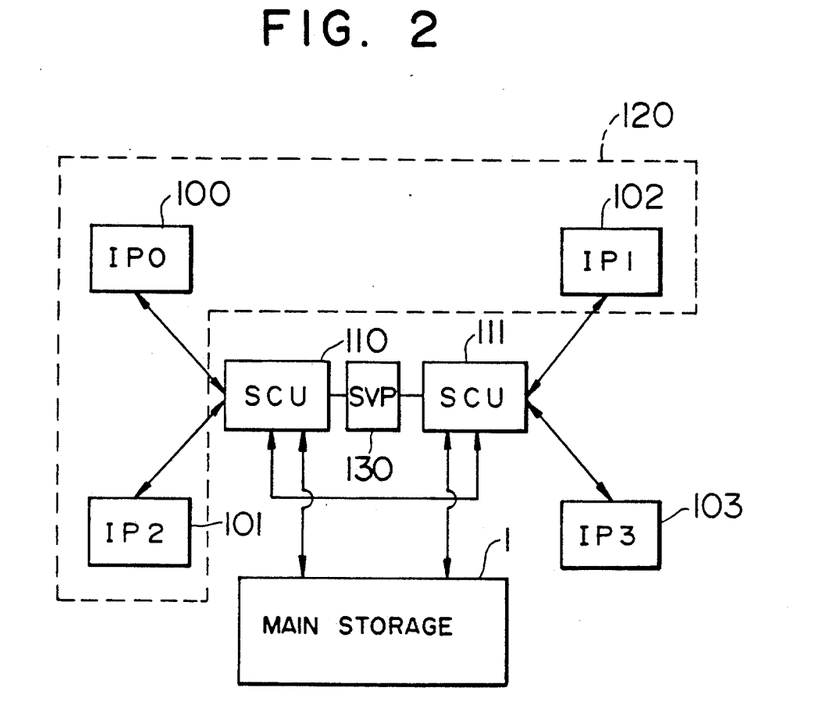
FIG. 2 shows a basic block diagram of a hardware configuration for realizing a processor group of the present invention.

An SPGIP instruction 901 is used to set at the register 282 in FIG. 1B a processor group identifier to the processors in the processor group to which it belongs. A second operand of this instruction is not used for addressing and an effective address of the operand represents the processor group identifier (PGID).

Specifically, of the 32-bit second operand address which is a sum of the content of the register B2 and the content of D2, the bit mask 901a consisting of bits 1-31 is the PGID. When bit i (i=1-31) is "1", it means that the processor i-1 (=0-30) is in the processor group. The processor group identifier PGID can be set directly to the register 282 from the service processor 130.

An SNPG instruction 902 sets the number of all processors in the processor group to which the processor of its own belongs into the processor register (283 in FIG. 1). Since the number of processors designated by this instruction is information needed for the synchronous execution, it is necessary to use this instruction to set the number of processors when the synchronous execution among the processors by the processor group is to be limited. The operand of this instruction is not used for addressing and the effective address of the operand represents the number of processors.

A CTLPG instruction 903 controls the start and stop of the limitation of the synchronous execution among the processors by the processor group. The operand of this instruction is not used for addressing, and when the bit 31 of the effective address of the instruction is "1", the limitation of the signal by the processor group is started. When it is "0", the limitation of the signal is stopped.

In the present embodiment, the above mechanism and method are used to realize the processor group and reduce the processor overhead in controlling the virtual machine system.

In the present embodiment, the information in the processor register used to count the end signals for the synchronous execution from the processors in the processor group set for the synchronous execution may be stored in the main storage.

In one embodiment, the timing to execute the next instruction is determined by counting the end signals from the processors in the same processor group. In the other embodiment, the bit map which stores the information of the processors in the same processor group is used. A requesting processor sets a corresponding bit to a logical "1" state when it receives an end signal from a requested processor, and the execution of instruction is resumed when the bit map of the same processor group is in the all-"1" state.

In the present embodiment, the processor group mechanism is controlled by the instruction which determines whether the synchronous execution by the processor group is to be limited or not. In addition to this function, a mechanism for indicating an operation condition of the virtual machine may be provided, and when the processor is operating as the virtual machine, the signaling by the processor group may be limited, and when the processor shifts from the virtual machine operation to the control program operation, the mode which does not effect the synchronous execution by the processor group may be established.

In accordance with the present invention, the synchronous execution by the processor group may be limited. Thus, in the virtual machine system, when the virtual machine runs only on a specific processor and an instruction relating to the address translation look-aside buffer is issued from the virtual machine, it is possible to prevent the overhead of the synchronization which heretofore has been caused by the synchronous execution by all of the processors in the system. Accordingly, 30-40% of the process time required for the instruction execution for the address translation look-aside buffer of the prior art system can be saved.

Since the processing is limited to only the portion relating to the virtual machine in the invalidation process for the entire address translation look-aside buffer and the entries, the other portions of the address translation buffer and the entries are not purged and hence the address translation overhead increase in the system can be avoided.

We claim:

1. In a multiprocessor system having a plurality of processors which are tightly coupled to each other and a main storage shared by the processors, a method for executing an instruction requiring synchronization among said processors, said method comprising the steps of:

statically providing to every one of the plurality of processors, regardless of tasks to be processed, group identification information for grouping the plurality of processors into a plurality of groups in accordance with a desired configuration condition, each of the groups of processors being provided with the same group identification information comprising at least one, wherein at least one of the groups comprises at least two processors processor;

storing parameter information related to an instruction originally requiring synchronization among the plurality of processors in the main storage;

sending request information for synchronous execution of the instruction from a processor of a particular group of said plurality of processors, serving as an instruction issuing processor, to receiving processors of said particular group of the plurality of processors when said particular group processes one of the tasks, said request information including group identification information of said particular group;

comparing, in each of said receiving processors, the group identification information provided to each of said receiving processors to the group identification information included in the sent request information;

reading out the parameter information from the main storage to execute the instruction in accordance with the read out parameter information in each processor of said particular group of said receiving processors, in which coincidence was found between group identification information provided to each of said receiving processors and group identification included in the sent request information according to said comparing step;

invalidating the sent request information in each of said receiving processors except for processors included in said particular group of processors for which the instruction was intended;

generating end information in each processor of said particular group of processors when the processor completes processing of the instruction; and waiting, in said instruction issuing processor, for the end information from each processor of said particular group having processed the instruction, except for said instruction issuing processor, to detect termination of the synchronous execution of the instruction.

2. A method for synchronously executing an instruction according to claim 1, wherein said desired configuration condition includes the group identification information, configuration defining information for variably assigning one or more virtual machines to one or more groups of processors and an operating system for operating on each of said virtual machines.

3. A method for synchronously executing an instruction according to claim 2, wherein when the instruction is issued from said operating system operating on a first virtual machine from among said virtual machines, only virtual machines in a group to which said first virtual machine belongs can execute processes necessary for complete execution of the instruction in response to the request information.

4. A method for synchronously executing an instruction according to claim 3, wherein said instruction requiring the synchronization includes at least a purge address translation look-aside buffer extended instruction, an invalidate page table entry instruction, a set storage key extended instruction, and a reset reference bit extended instruction.

5. A method for synchronously executing an instruction according to claim 1, wherein the parameter information includes at least group identification information, and, in response to the request information, each processor in said particular group reads out the parameter information from the main storage based on the group identification information.

6. A method for synchronously executing an instruction in a computer system comprising a plurality of processors from a tightly coupled multiprocessor system sharing a main storage, said method comprising the steps of:

statically providing, to each of a plurality of processors constituting said multiprocessor system, group identification information for grouping said plurality of processors into a plurality of groups of said processors in accordance with a desired configuration condition, regardless of tasks to be processed by any said group of said processors, said group identification information identifying which of said groups of processors each said processor belongs to, each of said groups of processors being independent from each other;

referring to said group identification information of an instruction issuing processor from among said plurality of groups of said plurality of processors to ascertain whether said instruction issuing processor belongs to a particular group of processors when an instruction requiring synchronization among said particular group of processors is to be executed;

sending a request signal requesting synchronous execution of the instruction from said instruction issuing processor to receiving processors belonging to the same said particular group of processors as said instruction issuing processor;

storing parameter information relating to the instruction into said main storage;

fetching the parameter information stored in said main storage and supplying the fetched parameter information to a first receiving processor from among said receiving processors in response to said request signal;

executing the instruction in the first receiving processor based on the fetched parameter information;

sending an end signal from the first receiving processor to said instruction issuing processor when the first receiving processor completes processing of the instruction; and restarting parallel processing of the task in response to all of said end signals from those of said processors ascertained to belong to the same particular group of processors as the instruction issuing processor.

7. A method for synchronously executing an instruction according to claim 6, wherein said desired configuration condition includes the group identification information, configuration defining information for variably and respectively assigning one or more virtual machines to processors in said multiprocessor system and operating systems, each of said operating systems operating a corresponding virtual machine.

8. A method for synchronously executing an instruction according to claim 7, wherein when the instruction requiring synchronization is issued from an operating system operating a first virtual machine, only virtual machines in said particular group to which said first virtual machine belongs can execute processes necessary for complete execution of the instruction in response to the request information.

9. A method for synchronously executing an instruction according to claim 8, wherein said instruction requiring synchronization includes at least a purge address translation look-aside buffer extended instruction, an invalidate page table entry instruction, a set storage key extended instruction and a reset reference bit extended instruction.

10. A computer system, which is configured in a tightly coupled multiprocessor system having a plurality of processors, each processor of said plurality of processors comprising:

group identification means for holding identification information representing a group of processors to which each of said processors belongs, each processor of said plurality of processors belonging to a particular group of processors, to define one of said particular groups of processors included in the computer system, said identification information being predeterminedly and statically provided;

identification signaling means, coupled to said group identification means, for signaling said identification information of one processor, when said one processor serves as an instruction issuing processor and is to execute an instruction originally requiring synchronization among processors of the same said particular group of processors as said instruction issuing processor for processing of a task in parallel by said particular group of processors; and means responsive to said signaling means signaling identification information for a second instruction issuing processor separate from said one processor, for determining if said one processor belongs to the same processor group as said second instruction issuing processor based on the identification information sent from said second instruction issuing processor and the identification information of the group to which said one processor belongs, executing the instruction when said one processor is determined to belong to the same particular group of processors as said second instruction issuing processor, and invalidating the synchronization when said one processor is determined to not belong to the same group as said second instruction issuing processor.

11. A computer system according to claim 10, further comprising:

service processor means for setting the identification information in each processor of said plurality of processors.

12. A computer system according to claim 10, wherein said one processor further comprises:

means responsive to said signaling means of said second instruction issuing processor, for returning a response to said second instruction issuing processor; and identifying means for detecting the responses from all processors in said particular group to identify all processors in said particular group of processors.

13. A computer system according to claim 12, wherein said one processor further comprises:

means for storing a total for the number of processors in said particular group of processors to which said one processor belongs, and said identifying means identifies said processors in said particular group of processors in accordance with the number of said detected responses.

14. A computer system according to claim 10, wherein said group identification means includes means for storing address information of all of said processors in said particular group of processors to which said one processor belongs in a storage area and said identification signaling means includes means for referring to said storage area and signaling the identification information to all of said processors in said particular group of processors to which said one processor belongs, in accordance with the address information.

15. A computer system according to claim 10, further comprising:

a main storage having a control program for controlling said plurality of processors and a program for controlling signaling among said plurality of processors.

16. A computer system configured as a tightly coupled multiprocessor system by forming a plurality of groups having a plurality of processors in accordance with a desired configuration condition, each processor of said plurality of processors comprising:

group identification means for holding identification information for identifying processors belonging to a same particular processor group as one processor of said plurality of processors;

means, responsive to execution of an instruction originally requiring synchronization among all of said plurality of processors in said computer system, for referring to said identification information of said group identification means and for ascertaining those processors of said plurality of processors belonging to said same particular group of processors as said one processor;

signaling means responsive to said referring and ascertaining means for requesting synchronous execution of said instruction by said one processor to said ascertained processors of said same particular group of processors;

and executing means for executing the execution request in said ascertained processors of said same particular group of processors.

17. A computer system according to claim 16, wherein said group identification means is a bit map register for storing said identification information.

18. A computer system according to claim 17, wherein said one processor further comprises:
means for storing a total of processors in said particular group of processors to which said one processor belongs, said identifying means identifying processors in said particular group of processors in accordance with said number of detected responses.

19. A computer system according to claim 16, wherein said one processor further comprises:
means responsive to said signaling means of another processor, for returning a response to said another processor; and
identifying means for detecting the responses from all the processors in said particular group of processors to which said one processor belongs, to identify all the processors in said particular group of processors.

20. A computer system according to claim 16, wherein said group identification means includes means for storing, as said identification information, address information of said processors in said particular group of processors to which said one processor belongs in an area of storage, and said signaling means includes means for referring to said storage area and requesting the synchronous execution of said instruction.

21. In a multiprocessor system including a plurality of processors and a main memory, a method for decreasing overhead of the system, said method comprising the steps of:
statically forming groups of processors from among said plurality of processors in advance in accordance with a system configuration designated by a user to assign one or more operating systems to a particular one of said groups of processors, each of said operating systems being able to operate on corresponding ones of said processors within said particular group of processors,
said forming step comprises the step of assigning a group identifier to each of the group processors;
generating, from one processor of said particular group of processors, a processing request which is associated with a particular one of said operating systems,
said generating step comprises the step of generating the processing request such that the processing request includes the group identifier;
sending said processing request from said one processor of said particular group of processors to said processors of said particular group of processors; and
responding to said processing request in each of said processors of said particular group of processors, except for said generating processor, and neglecting said processing request in each of said processors not included in said particular group of processors,
said responding step comprises the step of responding to the processing request in accordance with coincidence between the assigned group identifier and the group identifier included in the processing request.

22. A method according to claim 21, wherein said generating step comprises the step of generating the processing request to all of the plurality of processors.

23. A method according to claim 21, wherein each of said group of processors has information representing the processors in a corresponding group of processors, and said generating step comprises the step of generating the processing request to a corresponding group of processors for said generating processor.

24. A method according to claim 21, further comprising the step of waiting for response information from each of the group of processors in the generating processor to detect completion of processing concerning the processing request.

25. A method according to claim 21, further comprising the step of waiting for an elapsing of a period of predetermined time in the generating processor to detect completion of processing concerning the processing request.

26. In a computer system including a plurality of processors and a main memory, a method for decreasing overhead of said computer system, said method comprising the steps of:
statically forming groups of processors from among said plurality of processors in advance in accordance with a system configuration designated by a user to assign one or more operating systems to a particular one of said groups of processors, each of said operating systems being able to operate on each of said processors within the same said particular group of processors, one or more virtual machines being assigned to said particular group of processors to form groups of said virtual machines, one operating system operating on each group of virtual machines,
said forming step comprises the step of assigning a group identifier to each of the groups of processors;
generating from one of said operating systems, which is associated with one of said groups of virtual machines, a processing request which is associated with one said processor of said particular group of processors,
said generating step comprises the step of generating the processing request such that the processing request includes the group identifier;
sending said processing request from said one processor of said particular group of processors to said processors of said particular group of processors; and
responding to said generated processing request in each of said processors of said particular group of processors, except for said one processor corresponding to a generating virtual machine associated with said operating system, and neglecting the processing request in each of the plurality of processors not included in said particular group of processors, said responding step comprises the step of responding to the processing request in accordance with coincidence between the assigned group identifier and the group identifier included in the processing request.

27. A method according to claim 26, wherein said generating step comprises the step of generating the processing request to each of said processors in each of said groups of processors which receives said processing request.

28. A method according to claim 26, wherein each processor of each of said particular groups of processors has information representing the processors in said particular group of processors and said generating step comprises the step of generating said processing request to said processor of the group which receives said processing request except for a processor corresponding to said generating virtual machine.

29. A method according to claim 26, further comprising the step of waiting for response information from each processors of said particular group of processors, in the generating processor, to detect completion of processing concerning said processing request.

30. A method according to claim 26, further comprising the step of waiting for an elapsing of a period of predetermined time in the generating processor to detect completion of processing concerning the processing request.

31. A method for executing instructions in a multiprocessor system in which a main storage is shared by a plurality of processors, said method comprising the steps of:
    statically dividing said plurality of processors into a plurality of groups of processors in accordance with a desired configuration condition prior to execution of said instructions;
    generating parameter information to one of said groups of processors when a particular one of said plurality of processors executes an instruction which requires synchronization processing among the other of said processors belonging to the same group of processors as said particular processor, said parameter information generation being based on a group identifier assigned to said particular processor;
    sending said parameter information and a signal requesting said synchronization from said particular processor to respective ones of said other processors of said same group of processors;
    determining, in each of said respective other processors, whether or not said respective processor belongs to said same group of processors to which said particular processor sending said signal belongs, said determination based on said parameter information and said group identifier assigned to each of said respective other processors; and
    executing said synchronization processing in each of said respective other processors that is determined to belong to said group of processors to which said processor sending said signal belongs.

32. A method for executing instructions in a multiprocessor system according to claim 31, wherein said parameter information and said signal requesting synchronization processing are sent via said main storage.

33. A method for executing instructions in a multiprocessor system according to claim 31, further comprising the step of invalidating said signal requesting synchronization processing, in a respective one of said other processors, when it is determined that said respective one of said other processors does not belong to said group of processors to which said processor sending said signal requesting synchronization processing belongs.

34. A method for executing instructions in a multiprocessor system according to claim 31, wherein said multiprocessor system comprises an operating system which occupies at least one processor constituting a plurality of virtual processors corresponding to said plurality of processors.

35. A method for executing instructions in a multiprocessor system in which a main storage is shared by a plurality of processors, said method comprising the steps of:
    statically dividing said plurality of processors into a plurality of groups of processors in accordance with a desired system configuration;
    assigning group information to each of said groups of processors relating to respective ones of said plurality of processors which belong to respective ones of said groups of processors;
    identifying processors which belong to respective ones of said groups of processors, based on said group information, when a particular one of said respective processors executes an instruction which requires synchronization processing among other of said respective processors;
    sending a signal requesting said synchronization processing to respective ones of said processors belonging to the same group of processors to which said particular processor belongs; and
    executing said synchronization processing in response to said requesting signal in each of said processors belonging to the same group of processors which receive said requesting signal.

36. A method for executing instructions in a multiprocessor system according to claim 35, wherein said multiprocessor system comprises an operating system which occupies at least a processor constituting a plurality of virtual processors corresponding to said plurality of processors.x

* * * * *